(12) United States Patent
Ross et al.

(10) Patent No.: US 8,593,462 B2
(45) Date of Patent: Nov. 26, 2013

(54) METHOD AND SYSTEM OF CORRELATING A MEASURED LOG TO A PREDICTED LOG

(75) Inventors: William C. Ross, Littleton, CO (US); Richard J. Langenwalter, Lakewood, CO (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 13/883,689

(22) PCT Filed: Jul. 29, 2011

(86) PCT No.: PCT/US2011/045841
§ 371 (c)(1),
(2), (4) Date: May 6, 2013

(87) PCT Pub. No.: WO2013/019174
PCT Pub. Date: Feb. 7, 2013

(65) Prior Publication Data
US 2013/0222390 A1    Aug. 29, 2013

(51) Int. Cl.
*G06T 17/00* (2006.01)
*G06T 11/20* (2006.01)
*E21C 35/08* (2006.01)

(52) U.S. Cl.
USPC ............................. 345/440; 345/420; 299/1.1

(58) Field of Classification Search
None
See application file for complete search history.

(56) References Cited

U.S. PATENT DOCUMENTS

| | | | |
|---|---|---|---|
| 4,635,238 A | 1/1987 | Gallagher et al. | |
| 5,570,321 A | 10/1996 | Bernitsas | |
| 5,675,147 A * | 10/1997 | Ekstrom et al. | 250/256 |
| 6,611,761 B2 | 8/2003 | Sinha et al. | |
| 6,982,928 B2 | 1/2006 | Al-Ali | |
| 7,191,850 B2 * | 3/2007 | Williams | 175/45 |
| 8,219,319 B2 * | 7/2012 | Skelt | 702/7 |
| 2005/0140373 A1 * | 6/2005 | Li et al. | 324/338 |
| 2010/0088035 A1 | 4/2010 | Etgen et al. | |
| 2010/0259415 A1 | 10/2010 | Strachan et al. | |
| 2011/0042080 A1 | 2/2011 | Birchwood et al. | |

FOREIGN PATENT DOCUMENTS

EP    1176393 A2    1/2002
WO    2011/146079    11/2011

OTHER PUBLICATIONS

International Search Report and Written Opinion issued Mar. 14, 2013 in International Application No. PCT/US2012/051658 filed Aug. 20, 2012.
International Search Report and Written Opinion issued Mar. 5, 2012 in International Patent Application No. PCT/US2011/045841, filed Jul. 29, 2011.

* cited by examiner

*Primary Examiner* — Carlos Perromat
(74) *Attorney, Agent, or Firm* — Bradley Misley; Mark E. Scott; Conley Rose, P.C.

(57) ABSTRACT

Correlating a measured and predicted log. At least some illustrative embodiments are methods including: plotting values of the measured log with respect to an ordinate axis and an abscissa axis, and the plotting in a first pane; plotting values of the predicted log with respect to the ordinate axis and the abscissa axis; selecting an inflection point of the predicted log; shifting horizontal position of the inflection point relative to the measured log responsive to the pointing device; changing dip of at least one modeled surface in a structural model based the relative location of the inflection point; recalculating the predicted log based on the change in dip, the recalculating creates a modified predicted log; and then plotting the modified predicted log. In some cases, the method may also include adding a fixed X, Y, Z point in the at least one modeled surface based on location of the inflection point.

23 Claims, 6 Drawing Sheets

METHOD AND SYSTEM OF CORRELATING A MEASURED LOG TO A PREDICTED LOG

BACKGROUND

Advances in horizontal drilling have increased the ability to economically recover hydrocarbons from hydrocarbon bearing formations. However, placement of the horizontal borehole (also known as a lateral) requires particular accuracy. For example, a shale formation may be several thousand feet below the surface, and the shale formation itself may be on the order of 1000 feet thick. Within the illustrative 1000 feet of thickness only a few relatively thin zones, each zone on the order of tens of feet thick, may be suitable locations for placement of the lateral and extraction of hydrocarbons (i.e., target zones). Outside the target zones, some hydrocarbon extraction may be possible, but such extraction is in most cases not economically viable.

Moreover, physical phenomena such as faulting and differential compaction may make the true vertical depth of a target zones different as a function of horizontal location within the hydrocarbon bearing formation. Even if one is able to identify at a particular location a target zone for lateral placement (e.g., at a survey borehole), the precise depth of the target zone may change as a function of distance from the particular location.

Thus, any advance which results in better steering of horizontal boreholes would provide a competitive advantage.

BRIEF DESCRIPTION OF THE DRAWINGS

For a detailed description of exemplary embodiments, reference will now be made to the accompanying drawings in which.

NOTATION AND NOMENCLATURE

Figure 1:
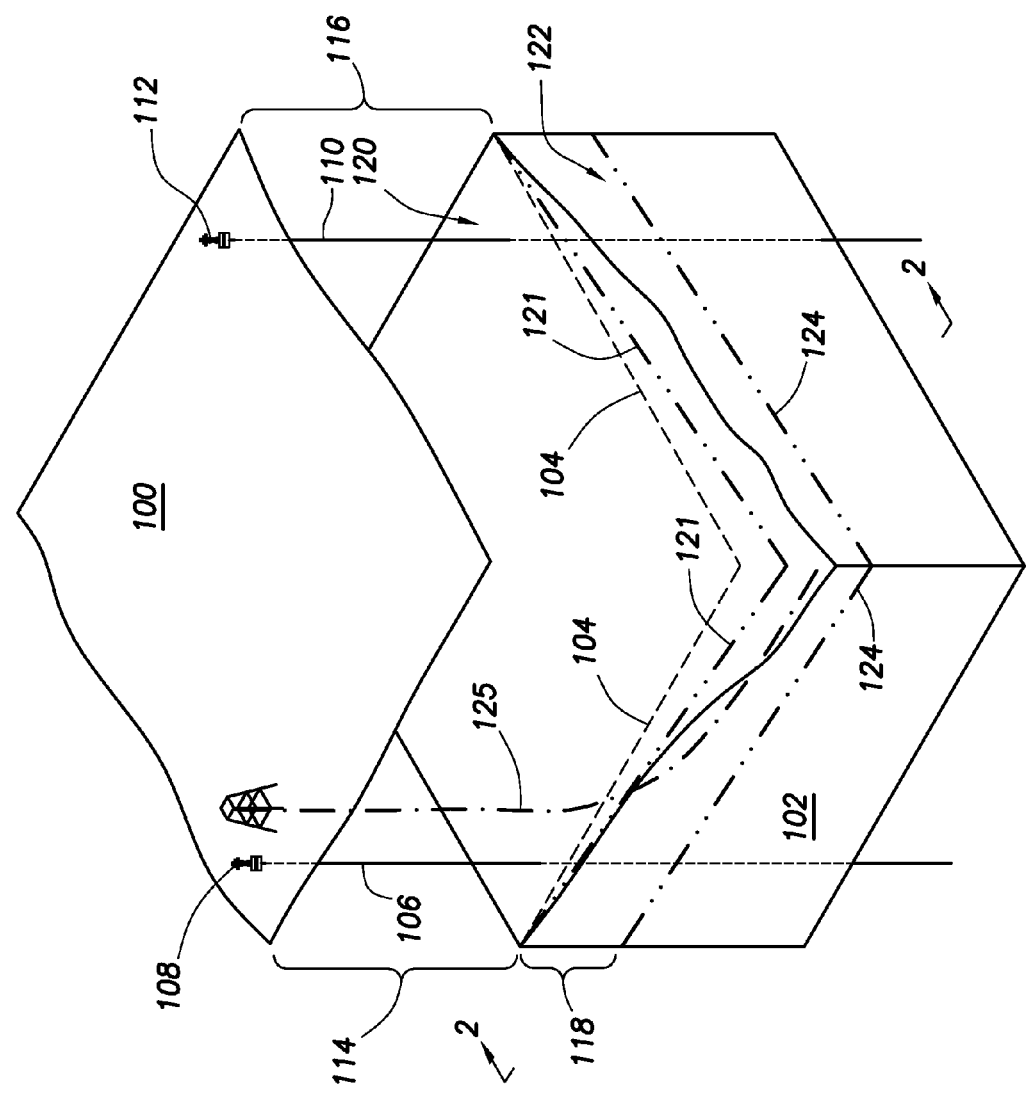
FIG. 1 shows a perspective cutaway view of a portion of hydrocarbon bearing formation, and in accordance with at least some embodiments.

Certain terms are used throughout the following description and claims to refer to particular system components. As one skilled in the art will appreciate, oilfield service companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect electrical connection.

"Measured log" shall mean a series of values where each value is indicative of a measured parameter of a rock formation at a position along a wellbore. Measured log shall include not only an entire measured log, but also portions of a measured log less than the entire measured log.

"Predicted log" shall mean a series of values where each value is indicative of a predicted parameter of a rock formation at a position along a wellbore. Predicted log shall include not only an entire predicted log, but also portions of a predicted log less than the entire predicted log.

"Wellbore" shall mean a hole drilled into the Earth's crust used directly or indirectly for the exploration or extraction of natural resources, such as oil, natural gas, or water.

"Horizontal wellbore" shall mean a wellbore where at least a portion of the wellbore has a deviation from a vertical orientation that exceeds at least 20 degrees. The fact that a wellbore may initially be drilled with a vertical orientation, and the fact that the horizontal wellbore may not be exactly horizontal in relation to a face of the earth or a horizontal plane, shall not obviate the status as a horizontal wellbore.

"Line segment" shall mean either a straight or curved line.

"Drag-and-drop" shall mean that a feature on a display device is selected responsive to commands received from a pointing device, and while selected the position of the feature is changed responsive to commands received.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments of the invention are directed to systems and related methods of correlating a predicted log along a horizontal wellbore to a measured log along the horizontal wellbore, and in some cases changing drilling direction responsive to the correlation. Before getting into the specifics of the various embodiments, it is helpful to discuss certain conceptual topics.

Underground hydrocarbon bearing formations may reside several thousand feet below the face of the earth, and may be several thousand feet thick. While an entire formation may be saturated to some extent with hydrocarbons, hydrocarbons may be economically produced from particular locations (e.g., near the top of the formation of porous rock, or within particular zones of shale formations). The relatively small zones from which hydrocarbons can be economically produced are referred to herein as target zones.

FIG. 1 shows perspective cutaway view of a portion of the earth's crust. In particular, FIG. 1 shows the face 100 of the earth (referred to as the face rather than the "surface" as "surface" has a particular meaning, discussed more below). Below the face 100 is portion of a hydrocarbon bearing formation 102 (shown in solid lines). The overburden layers between the face 100 and the hydrocarbon bearing formation 102 are not shown so as not to unduly complicate the figure. Though the materials that make up hydrocarbon bearing formation 102 may initially be deposited in horizontal layers, differential compaction and faulting may result in dip. In particular, dashed line 104 may illustrate two edges of a horizontal plane, and thus the illustrative hydrocarbon bearing formation 102 dips downwardly in the direction of the viewer in FIG. 1.

FIG. 1 also shows several wellbores drilled into the hydrocarbon bearing formation. For example, wellbore 106 is shown to be a vertically oriented wellbore that extends through the hydrocarbon bearing formation 102. Wellbore 106 is associated with wellhead 108 to illustrate that the wellbore 106 has been previously drilled, and in some situations the wellbore 106 may have a casing therein. Likewise, FIG. 1 illustrates wellbore 110 as a vertically oriented wellbore that extends through the hydrocarbon bearing formation 102. Wellbore 110 is associated with wellhead 112 to illustrate that the wellbore 110 has been previously drilled, and in some situations may have a casing therein. In the industry, wellbores 106 and 110 may be referred to as "offset wells" or "type wells" when discussed in relation to horizontal wellbores which are planned or currently being drilled, and thus will be referred herein as offset wells 106 and 110. While offset wells 106 and 110 are shown as vertically oriented and extending through the hydrocarbon bearing formation so as to be distinguishable from the proposed horizontal wellbore (discussed more below), offset wells need not necessarily be vertically oriented, or extend through the hydrocarbon bearing formation. Stated otherwise, offset wells may be any type of wellbore, including horizontal wellbores.

Information useful for planning trajectory of a horizontal wellbore may be determined from the offset wells 106 and 110. For example, by way of the offset well 106 the vertical depth 114 of the top of the hydrocarbon bearing formation 102 at the location of the offset well 106 may be accurately measured. Likewise, by way of the offset well 110 the vertical depth 116 of the top of the hydrocarbon bearing formation 102 at the location of the offset well 110 may be accurately measured. Moreover, a plurality of well logs may be taken within offset wells 106 and 110. For example, the offset wells may be logged while drilling, may be logged during the overall drilling process but with the drill string removed (e.g., logged by way of wireline logging devices), and/or may be logged after drilling has completed and a casing has been cemented therein. The well logs may provide a host of information about the hydrocarbon bearing formation 102. For example, the well logs taken in the offset wells may provide identifying information (i.e., marker information) for various depths within the hydrocarbon bearing formation 102. That is, the marker information helps identify a particular strata or depth within the hydrocarbon bearing formation 102. The marker information may be based on any measurable property of the hydrocarbon bearing formation 102, such as natural gamma radiation.

For purposes of further discussion, it is assumed that the target zone 118 of interest is a location just under the top of the hydrocarbon bearing formation 102; however, target zones need not be near the top of the hydrocarbon bearing formation. For example, in shale formations the target zone may reside at any depth within the depth of the formation. Once the target zone in relation to the offset wells 106 and 110 is identified, it may be assumed that the target zone extends linearly (that is, in a straight line sense) between relative locations of offset wells, such as offset wells 106 and 110. From this assumption, one or more "modeled" surfaces are created. Modeled surfaces shall be understood to be a mathematical creation—fictional line or surface—and do not necessarily have any true physical components. In the illustrative case of FIG. 1, an upper modeled surface 120 may be created which represents the assumed top of the hydrocarbon bearing formation 102. It may be known in advance that the hydrocarbon bearing formation 102 dips in the direction of the viewer in FIG. 1, but because there is not an offset well at the point in the hydrocarbon bearing formation 102 closest to the viewer the magnitude of the dip may not be precisely known. For this reason, the initial upper modeled surface 120 (defined in part by dashed-dot-dot-dash lines 121) may be initially assumed to have a slight dip, but as illustrated in FIG. 1 the dip may not necessarily match that of the actual formation 102.

In some cases, a lower modeled surface 122 may be created which identifies the assumed lower boundary of the target zone 118. In the illustrative case of FIG. 1 the lower modeled surface is defined in part by dash-dot-dot-dash lines 124. Before proceeding, it should be understood that having both an upper and a lower modeled surface is merely illustrative. The correlations between the measured log and predicted log discussed below may take place in the presence of single modeled surface, which could be the upper modeled surface in some cases, or just the lower modeled surface.

Based on the modeled surfaces 120 and 122, a plan for a horizontal wellbore is made (the proposed trajectory or proposed path 125 is shown by dashed-dot-dash line), with the proposed path of the horizontal wellbore to reside just below modeled surface 120 (or in cases where two modeled surfaces are used, between the modeled surfaces). In the illustrative case of FIG. 1, because of the lack of knowledge regarding the dip of the hydrocarbon bearing formation 102, if the horizontal wellbore is drilled exactly along the proposed path 125, the distal end of the horizontal wellbore will exit the top of the hydrocarbon bearing formation. As discussed more below, however, as the horizontal wellbore is being drilled, the relative location within hydrocarbon bearing formation 120 can be determined (based on the marker information), and the direction of the horizontal wellbore corrected to take into account the actual dip of the formation.

After the proposed path 125 planning has been completed, drilling of a horizontal wellbore along the proposed path 125 is begun, and the drill string used to create the horizontal wellbore may have one or more measuring-while-drilling ("MWD") tools (e.g., inclination sensor, directional sensor) to facilitate measuring actual physical placement with respect to modeled surfaces 120 and 122. That is to say, knowing the vertical depth of the modeled surfaces 120 and 122 at any particular location, and using information gathered by the MWD tools, the horizontal borehole drilled along proposed path 125 can be somewhat accurately placed in relation to the modeled surfaces 120 and 122. Physical placement based on knowledge of the direction and depth of the horizontal borehole as the horizontal borehole is being drilled is not a perfect science, however, and is subject to measurement inaccuracies, undershoot, and overshoot. Thus, some deviation from the proposed path 125 is to be expected in most situations.

The drill string used to create the horizontal wellbore along the proposed path 125 may also comprise one more logging-while-drilling ("LWD") tools which create one or more measured logs of formation parameters, the measured logs created contemporaneously with the drilling. While a variety of logging tools may be used, in order to utilize the marker information discussed above, at least one of the logging tools creates a measured log of the parameter from which the marker information is directly indicated, or can be derived (e.g., a natural gamma tool). At various times, after the horizontal borehole has entered the hydrocarbon bearing formation, the marker information is compared to the information of the measured log to make a determination as to where in the formation the horizontal wellbore resides, to make corrections to the modeled surfaces (if needed), and to make corrections to the drilling direction of the horizontal wellbore (if needed). The industry refers to the comparisons as a correlation of the measured log to a predicted log. The predicted log and the correlating are discussed more with respect to FIG. 2.

Figure 2:
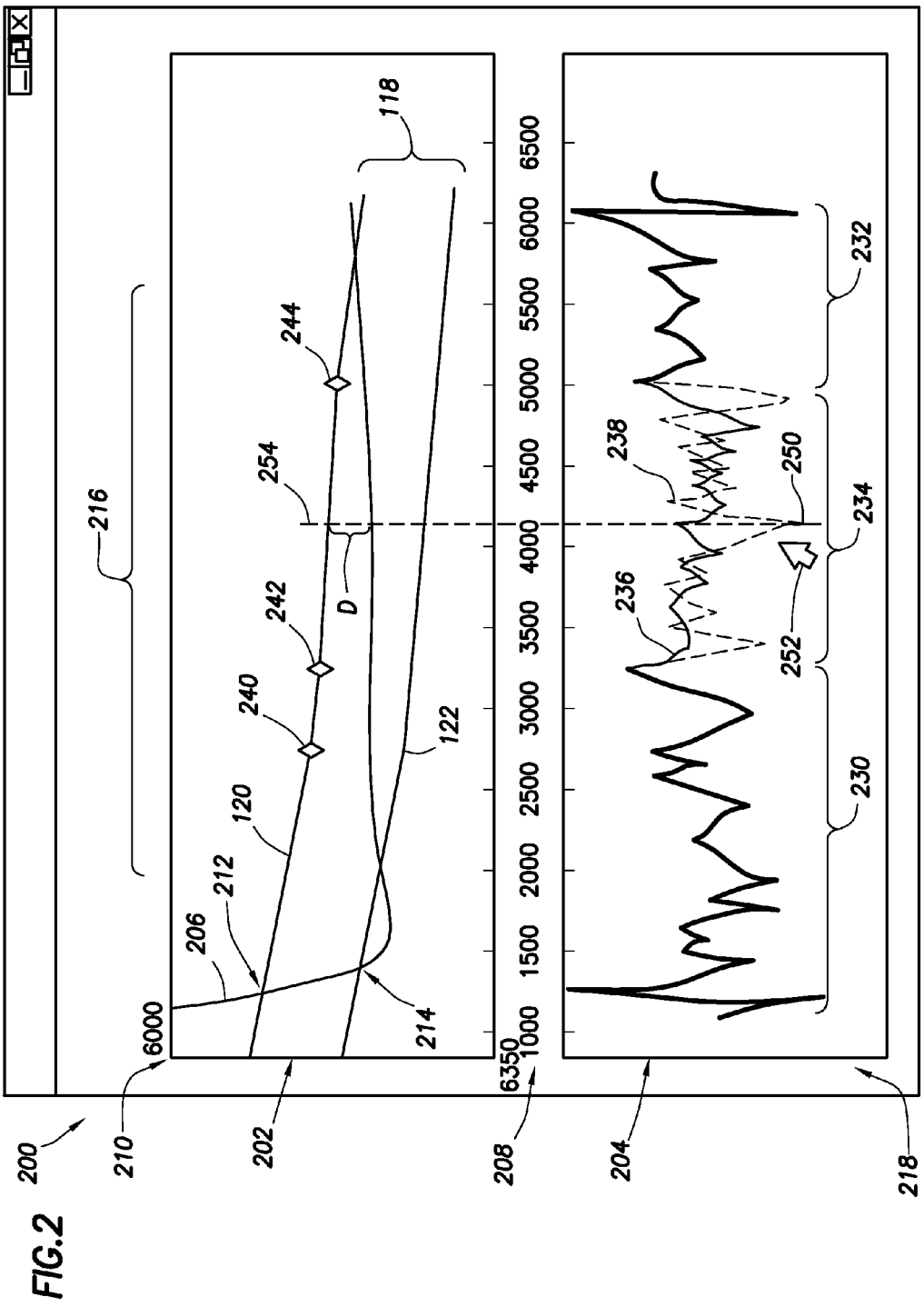
FIG. 2 shows a user interface in accordance with at least some embodiments.

FIG. 2 shows a user interface through which a user can interact with a program to implement correlating a measured log with a predicted log in accordance with at least some embodiments. The user interface may be displayed on a display device of a computer system. In particular, the illustrative user interface 200 comprises an upper window or upper pane 202, and a lower pane 204. The lower pane 204 may be referred to as a measured and predicted log window, and the upper pane 202 may be referred to as a wellbore and surface pane. Within the illustrative upper pane 202 are plotted a two dimensional view of the upper modeled surface 120 and the lowered modeled surface 122 (e.g., the view taken along lines 2-2 of FIG. 1). That is, in the two-dimensional view of FIG. 2, the upper modeled surface 120 and the lower modeled surface 122 appear as line segments. Also plotted in the illustrative upper pane 202 is the actual trajectory of the horizontal wellbore 206 (the proposed path is not shown), which also appears as a line segment. The upper modeled surface 120 and lower modeled surface 122, as well as the trajectory of the horizontal wellbore 206, are plotted against the abscissa axis 208 illustratively being a distance, and an ordinate axis 210 being depth (with illustrative depth 6000 feet at the top of the pane 202, and 6350 feet at the bottom of the pane).

In the example case plotted in upper pane 202, the horizontal wellbore 206 penetrates the upper modeled surface 120 at point 212, and also penetrates the lower modeled surface 122 at point 214. The horizontal wellbore 206 thus illustrates an overshot in trying to place the wellbore 206 in the target zone 118. Once the horizontal wellbore 206 enters again the target zone 118 between the upper modeled surface 120 and the lower modeled surface 122, the distal end of the horizontal wellbore 206 illustratively exits the target zone 118.

Within the illustrative lower pane 204 are plotted values of a measured log, as well as values of a predicted log, with the plotted values appearing as line segments. The measured log and predicted log are plotted against the abscissa axis 208 illustratively being a distance, and an ordinate axis 218 illustratively being magnitude of the values of the logs. Thus, both the measured log and predicted log are plotted against the same ordinate and abscissa axis. A measured log is a series of values of actually measured formation parameters, the values measured by a logging tool within the horizontal borehole 206. Any suitable formation parameter may be measured and used for the measured log, but in some embodiments the measured parameter is natural gamma radiation.

The predicted log, by contrast, is a modeled or synthetic log created from values of the measured parameter at the offset wells 106 and 110, taking into account dip of the modeled surfaces. Stated otherwise, each value of the predicted log is a value expected to be measured at each particular location of the trajectory of the horizontal wellbore 206 taking into account the distance the wellbore 206 is above or below a geological feature represented by the modeled surfaces. However, as discussed above the dip of the portions of the modeled surfaces between offset wells may not match the actual dip of the hydrocarbon bearing formation 102, and thus differences between the measured log and the predicted log may, in part, represent errors in the dip of the modeled surfaces. More particularly, the dip of the modeled surfaces may not match the actual dip of the formation at each predicted position (or depth) because of cumulative differences in dip along the length of the planned wellbore which, in combination 'carry' the actual to deeper or shallower positions as compared to the model surfaces. When the cumulative dips of the modeled surfaces accurately matches the cumulative dips of the hydrocarbon bearing formation 102, the measured log and predicted log should (in theory), fully overlap. Measurement inaccuracies, and inaccuracies in interpolation (due to structural complexity), to name a few, may cause the data to not precisely align point-for-point; however, major features of the measured log and predicted log will substantially align when the cumulative dips of the modeled surfaces accurately matches the actual cumulative dips of the hydrocarbon bearing formation.

Also of note is the idea that dip has both a global and local aspect. The illustrative hydrocarbon formation 102 of FIG. 1 is shown to dip downwardly in the direction of the viewer, and the dip illustrated may be considered a global phenomenon (i.e., considered over the entire formation). However, locally there may be undulations in the formation, such that while the global trend may be in a particular direction, local variations in dip may be opposite the global trend of the dip.

With the various issues regarding overlap of the measured log and predicted log, and the various issues regarding global and local dip, reference is again made to the lower pane 204 of the user interface 200 of FIG. 2. For purposes of explanation, in FIG. 2 portions of the measured log and predicted log have already been correlated. In particular, portion 230 and portion 232 have been correlated, and thus the measured log and predicted log overlap in these regions (the overlap shown by the heavy, dark line). When the measured log and predicted log are correlated, a fixed point or marker may then be created in one or both of the modeled surfaces. The fixed point represents a location (i.e., an X, Y, Z location in Cartesian Space) where modeled surface is presumed to accurately match the geological boundary of interest, and thus future adjustments to the modeled surface do not affect or change at the fixed point. Three illustrative fixed points are shown in the upper pane 202—fixed points 240, 242, and 244. However, in portion 234 the measured log 236 (solid line) and predicted log 238 (dashed line) do not overlap (i.e., are not correlated). Thus, within the portion 234 the measured log 236 and predicted log 238 need to be correlated.

Correlation in accordance with various embodiments involves selecting an inflection point in the predicted log 238. The inflection point selected may be a maxima, a minima, or just an inflection point between a set of maxima and minima. For purposes of explanation, consider that a user (e.g., geologist) would like to select the inflection point 250. Selection of the inflection point may take many forms. In some embodiments, a pointing attribute 252 (illustrative shown as an arrow) may be moved about the display device responsive to a pointing device (e.g., mouse, or touch-screen overlaying the display device). Based on the location of the pointing attribute 252 being placed on or near the inflection point 250, and possibly other action (e.g., mouse click), the inflection point is selected. In the illustration of FIG. 2, the selected inflection points represents a value of the predicted log at a particular distance D below the upper modeled surface 120 (the correlation between the inflection point 250, upper modeled surface, and distance D show in relation to dashed line 254). When the value of the selected inflection point 250 does not match or overlay the measured log, such indicates that the local dip of the modeled surface does not accurately match the actual dip.

Once a particular inflection point is selected, a correlation may be made by moving the inflection point left or right on the screen—that is, shifting the horizontal position of the inflection point. At a high level, the user shifts the inflection point until a match of the predicted log 238 and measured log 236 is found. The specification first discusses the visual aspects within the lower pane 204 of shifting the horizontal location of the inflection point 250, and then discusses conceptually the changes to the modeled surfaces responsive to shifting of the inflection point 250.

With respect to the visual aspects within the lower pane 204, shifting the horizontal position of the inflection point 250 correspondingly shifts the predicted log 238. Consider, for example, the portion of the predicted log 238 between the inflection point 250 and the portion corresponding to fixed point 242. Shifting the inflection point 250 in the direction of the fixed point 242 causes the portion of the predicted log 238 to contract, with plotted values of the predicted log 238 closer to the fixed point 242 moving less than plotted values of the predicted log 238 close to the inflection point. Likewise, shifting the inflection point 250 away from the fixed point 242 causes the portion of the predicted log 238 to expand, though still with plotted values of the predicted log 238 closer to the fixed point 242 moving less than plotted values of the predicted log 238 close to the inflection point 250. The portion of the predicted log between the inflection point 250 and fixed point 244 expands and compresses oppositely in this example. In some cases the action is referred to as a "stretch and squeeze" of the predicted log. In the illustrative case of FIG. 2, the portion 234 of the predicted log 238 that remains uncorrelated resides between two fixed points (fixed points 242 and 244), and thus movement of the infection point 250 causes changes to the portion 234 between fixed points 242 and 244, but portions 230 and 232 remain unchanged.

In some embodiments, changes to the predicted log responsive to the shifting of the inflection point 250 are animated. That is, the display device on which the user interface 200 is displayed is updated at about 20 frames a second or greater such that the compression and/or expansion of the predicted log 238 responsive to movement of the inflection point appears to be a smooth change. In other cases, particularly situations where the frame rate is limited or where the processing power of the underlying computer system is limited, the predicted log 238 may not be redrawn until the inflection point is de-selected (i.e., dropped in the drag-and-drop operation).

The visual aspects of the changes in the predicted log 238 responsive to horizontally shifting of the inflection point 250 are actually a consequence of changing dip of one or both the modeled surfaces 120 and 122. Still referring to FIG. 2, and particularly the upper frame 202, each value or point on the predicted log represents a value related to the distance or depth D. When the inflection point 250 does not overlay or correspond to the measured log 236, such a lack of correspondence means that the dip of the modeled surface may not match that of the actual formation. Shifting of the inflection point thus can be thought of as changing the dip of the modeled surface 120 until the predicted log 238 overlays or matches the measured log 236. In these embodiments, the distance or depth D remains constant, but is shifted responsive to shifting of the inflection point. Stated otherwise, the distance between representation of the horizontal wellbore 206 and the modeled surface (here the upper modeled surface 120) at the horizontal location of the inflection point 250 remains constant as the inflection point 250 is shifted (in the lower pane 204). The shifting and constant depth D results in changes in the dip, and corresponding changes in the predicted log.

Figure 3:
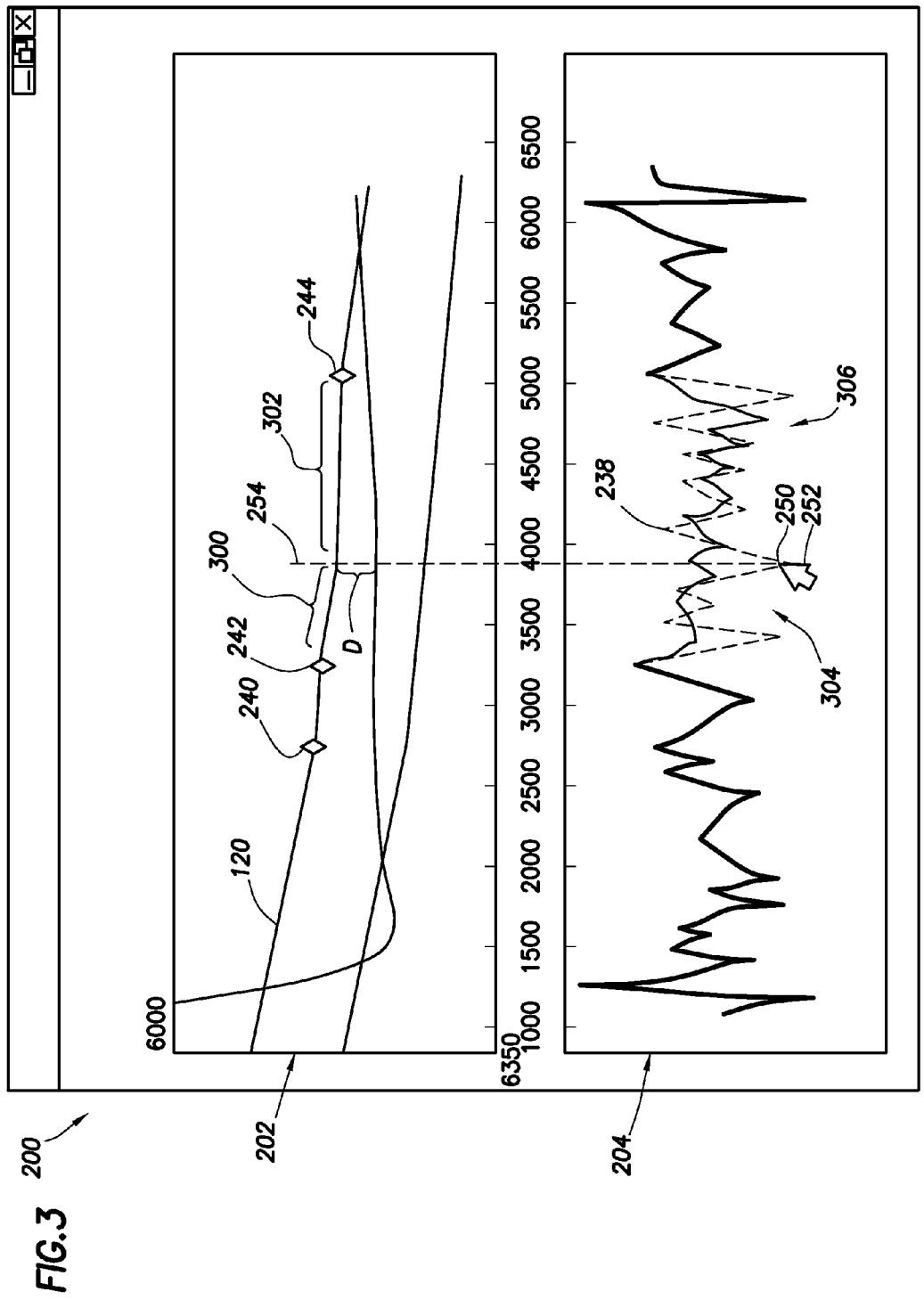
FIG. 3 shows a user interface in accordance with at least some embodiments.

FIG. 3 shows a view of the user interface 200 similar to that of FIG. 2, but illustratively shows the inflection point 250 shifted to the left from that of FIG. 2. Shifting the inflection point 250 to the left, but holding the depth D constant, in accordance with at least some embodiments results in changes in dip of the upper modeled surface 120. In particular, portion 300 of the modeled surface 120 dips from fixed point 242 to the corresponding location of the inflection point 250 (correlated by dashed line 254), and the dip has greater magnitude than that of FIG. 2. Likewise for portion 302 of the upper modeled surface, portion 302 of the modeled surface 120 dips from fixed point 244 to the corresponding location of the inflection point 250, and the dip has greater magnitude than that of FIG. 2. FIG. 3 also illustrates that in changing the dip of the upper modeled surface 120, the corresponding portions of the predicted log change. Portion 304 has the appearance of contraction in relation to the corresponding portion of FIG. 2, while portion 306 has the appearance of expansion in relation to the corresponding portion in the FIG. 2. In some cases, however, the predicted log 238 in the lower pane 204 is recalculated with each new dip adjustment shown in the upper pane 202, and the recalculation gives the appearance of expansion and contraction of the predicted log 238.

Figure 4:
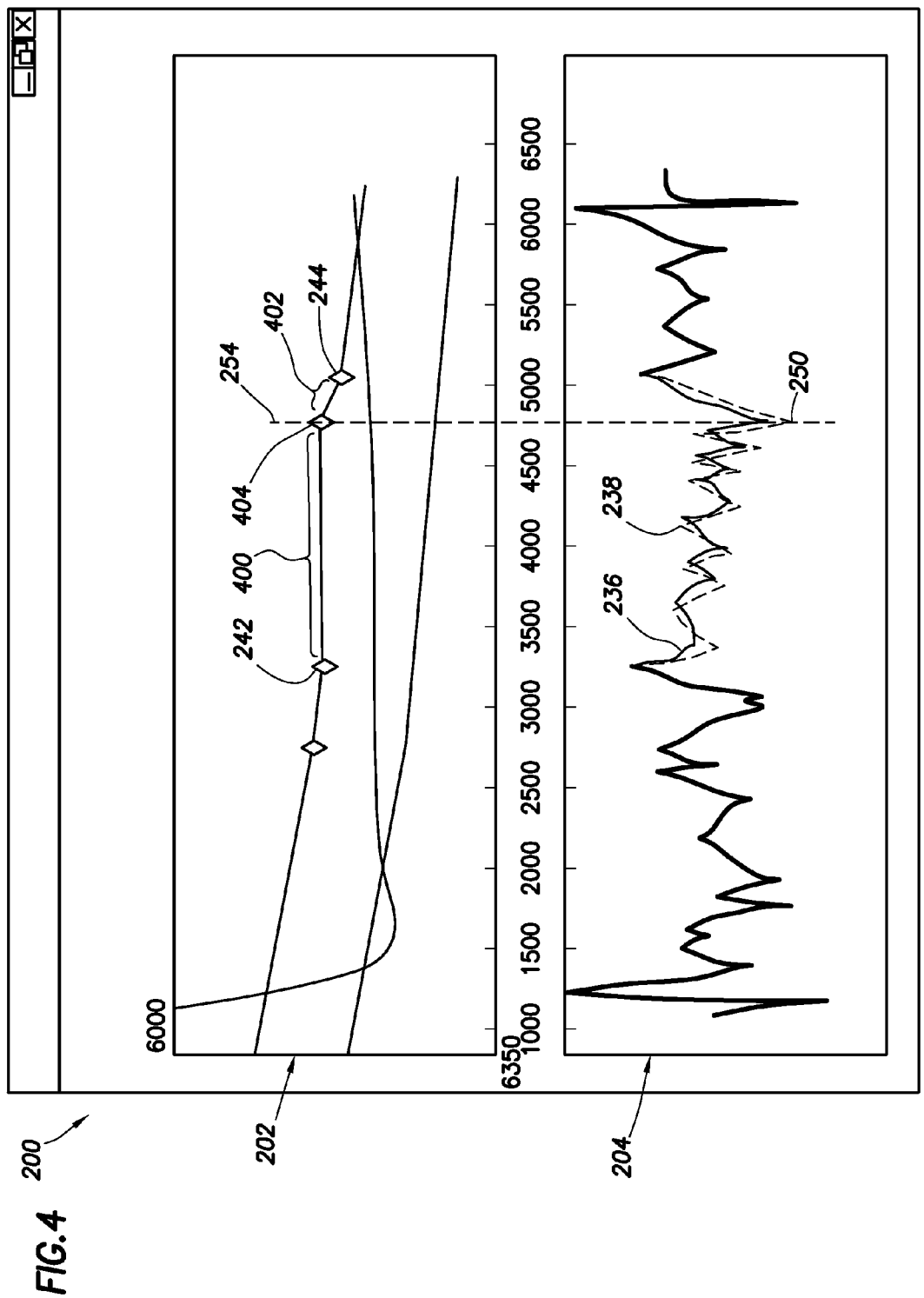
FIG. 4 shows a user interface in accordance with at least some embodiments.

FIG. 4 shows a view of the user interface 200 similar to that of FIG. 2, but illustratively shows the inflection point 250 shifted to the right from that of FIG. 2. Shifting the inflection point 250 to the right, but holding the dept D constant, in accordance with at least some embodiments results in changes in dip of the upper modeled surface 120. In particular, for portion 400 of the modeled surface 120 the dip has decreased from fixed point 242 to the corresponding location of the inflection point 250 (correlated by dashed line 254). Likewise for portion 402 of the upper modeled surface, for portion 402 of the modeled surface 120 the dip has increased dips from fixed point 244 to the corresponding location of the inflection point 250. Changing the dip of the upper modeled surface 120 results in changes in corresponding portions of the predicted log 238 in the lower pane 204. The changes in the predict log 238 caused by the illustrative changes in the dip make the predicted log 238 and measured log 236 overlay, and thus correlate. Given the substantial correlation, the user may "drop" the inflection point at the shifted location, thus creating a new fixed point 404.

Generically then, in accordance with the various embodiments correlations between the predicted log and measured log may be implemented by directly interacting with inflection points of the predicted log in relation to the measured log. The interaction may result in dip changes of one or more modeled surfaces which, in turn, results in changes to the predicted log (which is calculated based on the modeled surfaces). When a correlation is found, a fixed point may be created that ties or fixes the modeled surface at that location. Stated otherwise, when a correlation is found it is assumed that the modeled surface accurately matches the relevant portion of the underlying hydrocarbon bearing formation, and the point is fixed so that further correlations (e.g., correlations performed to the right of fixed point 404) utilized the fixed point as correct.

Figure 5:
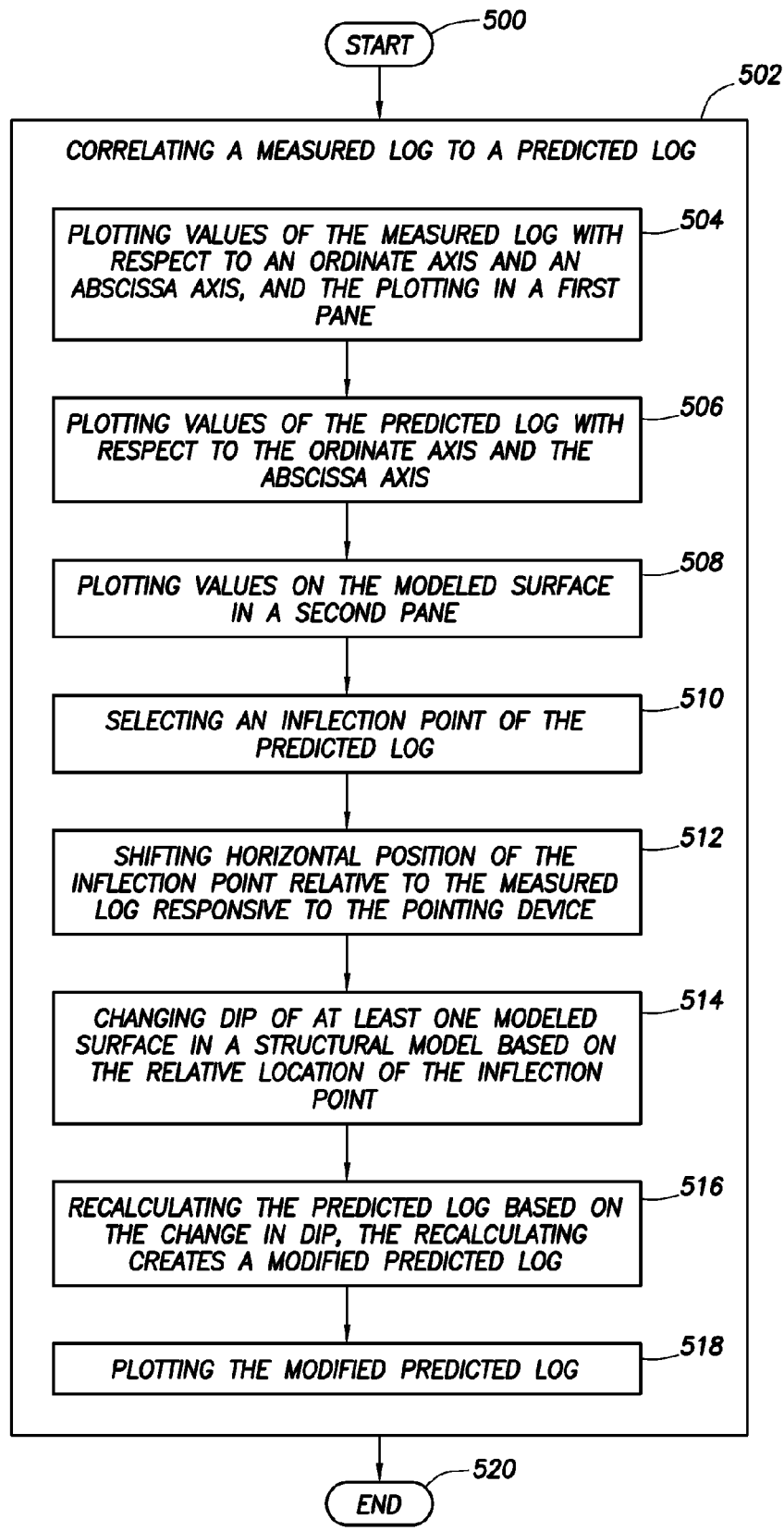
FIG. 5 shows a method in accordance with at least some embodiments.

FIG. 5 shows a method in accordance with at least some embodiments, and some of which may be implemented by way of computer instructions. In particular, the method starts (block 500) and comprises correlating a measured log to a predicted log (block 502). In some cases, correlating may comprise: plotting values of the measured log with respect to an ordinate axis and an abscissa axis, and the plotting in a first pane (block 504); plotting values of the predicted log with respect to the ordinate axis and the abscissa axis (block 506); plotting values the modeled surface in a second pane, (block 508); selecting an inflection point of the predicted log (block 510); shifting horizontal position of the inflection point relative to the measured log responsive to the pointing device (block 512); changing dip of at least one modeled surface in a structural model based on the relative location of the inflection point (block 514); recalculating the predicted log based on the change in dip, the recalculating creates a modified predicted log (block 516); and then plotting the modified predicted log (block 518). Thereafter the method ends (block 520), possibly to be restarted.

Figure 6:
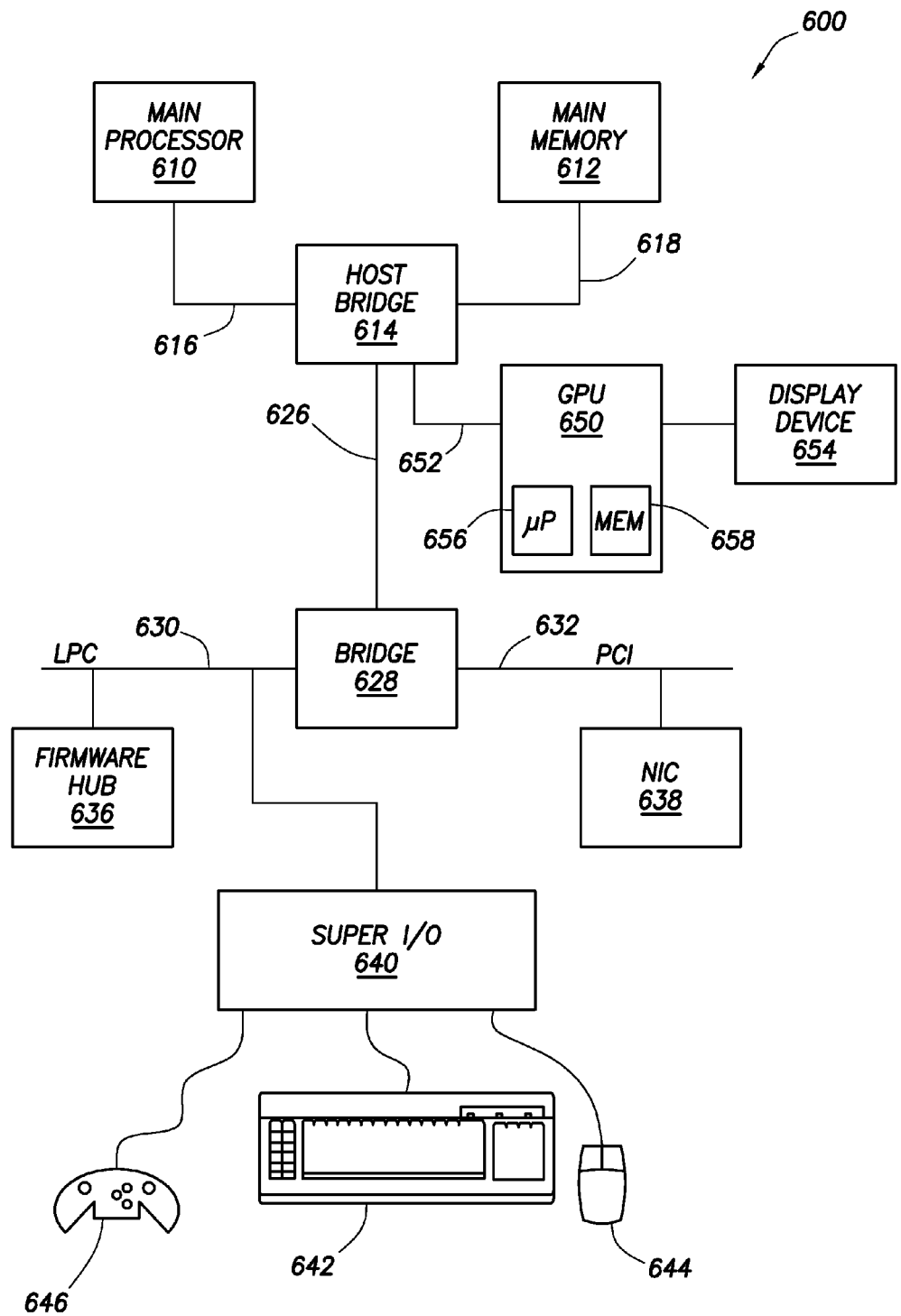
FIG. 6 shows a computer system in accordance with at least some embodiments.

FIG. 6 illustrates a computer system 600 in accordance with at least some embodiments. Any or all of the embodiments that involve use of a user interface, or a computer system to perform calculations, may be implemented on a computer system such as that shown in FIG. 6. In particular, computer system 600 comprises a main processor 610 coupled to a main memory array 612, and various other peripheral computer system components, through integrated host bridge 614. The main processor 610 may be a single processor core device, or a processor implementing multiple processor cores. Furthermore, computer system 600 may implement multiple main processors 610. The main processor 610 couples to the host bridge 614 by way of a host bus 616, or the host bridge 614 may be integrated into the main processor 610. Thus, the computer system 600 may implement other bus configurations or bus-bridges in addition to, or in place of, those shown in FIG. 6.

The main memory 612 couples to the host bridge 614 through a memory bus 618. Thus, the host bridge 614 comprises a memory control unit that controls transactions to the main memory 612 by asserting control signals for memory accesses. In other embodiments, the main processor 610 directly implements a memory control unit, and the main memory 612 may couple directly to the main processor 610. The main memory 612 functions as the working memory for the main processor 610 and comprises a memory device or array of memory devices in which programs, instructions and data are stored. The main memory 612 may comprise any suitable type of memory such as dynamic random access memory (DRAM) or any of the various types of DRAM devices such as synchronous DRAM (SDRAM), extended data output DRAM (EDODRAM), or Rambus DRAM (RDRAM). The main memory 612 is an example of a non-transitory computer-readable medium storing programs and instructions, and other examples are disk drives and flash memory devices.

The illustrative computer system 600 also comprises a second bridge 628 that bridges the primary expansion bus 626 to various secondary expansion buses, such as a low pin count (LPC) bus 630 and peripheral components interconnect (PCI) bus 632. Various other secondary expansion buses may be supported by the bridge device 628.

Firmware hub 636 couples to the bridge device 628 by way of the LPC bus 630. The firmware hub 636 comprises read-only memory (ROM) which contains software programs executable by the main processor 610. The software programs comprise programs executed during and just after power on self tests (POST) procedures as well as memory reference code. The POST procedures and memory reference code perform various functions within the computer system before control of the computer system is turned over to the operating system. The computer system 600 further comprises a network interface card (NIC) 638 illustratively coupled to the PCI bus 632. The NIC 638 acts as to couple the computer system 600 to a communication network, such the Internet.

Still referring to FIG. 6, computer system 600 may further comprise a super input/output (I/O) controller 640 coupled to the bridge 628 by way of the LPC bus 630. The Super I/O controller 640 controls many computer system functions, for example interfacing with various input and output devices such as a keyboard 642, a pointing device 644 (e.g., mouse), a pointing device in the form of a game controller 646, various serial ports, floppy drives and disk drives. The super I/O controller 640 is often referred to as "super" because of the many I/O functions it performs.

The computer system 600 may further comprise a graphics processing unit (GPU) 650 coupled to the host bridge 614 by way of bus 652, such as a PCI Express (PCI-E) bus or Advanced Graphics Processing (AGP) bus. Other bus systems, including after-developed bus systems, may be equivalently used. Moreover, the graphics processing unit 650 may alternatively couple to the primary expansion bus 626, or one of the secondary expansion buses (e.g., PCI bus 732). The graphics processing unit 650 couples to a display device 654 which may comprise any suitable electronic display device upon which any image or text can be plotted and/or displayed. The graphics processing unit 650 may comprise an onboard processor 656, as well as onboard memory 658. The processor 656 may thus perform graphics processing, as commanded by the main processor 610. Moreover, the memory 658 may be significant, on the order of several hundred megabytes or more. Thus, once commanded by the main processor 610, the graphics processing unit 650 may perform significant calculations regarding graphics to be displayed on the display device, and ultimately display such graphics, without further input or assistance of the main processor 610.

In the specification and claims, certain components may be described in terms of algorithms and/or steps performed by a software application that may be provided on a non-transitory storage medium (i.e., other than a carrier wave or a signal propagating along a conductor). The various embodiments also relate to a system for performing various steps and operations as described herein. This system may be a specially-constructed device such as an electronic device, or it may include one or more general-purpose computers that can follow software instructions to perform the steps described herein. Multiple computers can be networked to perform such functions. Software instructions may be stored in any computer readable storage medium, such as for example, magnetic or optical disks, cards, memory, and the like.

References to "one embodiment", "an embodiment", "a particular embodiment" indicate that a particular element or characteristic is included in at least one embodiment of the invention. Although the phrases "in one embodiment", "an embodiment", and "a particular embodiment" may appear in various places, these do not necessarily refer to the same embodiment.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a computer-readable media that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, the various embodiments have been discussed in terms of selecting inflection points between fixed points in the modeled surfaces; however, the application is not limited to just those inflection points. In other cases, inflection points already associated with fixed points can also be selected and moved. The result can be thought of as moving a previously implemented fixed point, or deleting a fixed point associated with the inflection point and creating a new fixed point. It is intended that the following claims be interpreted to embrace all such variations and modifications.

What is claimed is:

1. A method comprising:
   correlating a measured log to a predicted log, the correlating by:
   plotting values of the measured log with respect to an ordinate axis and an abscissa axis, and the plotting in a first pane on a display device of a computer system;
   plotting values of the predicted log with respect to the ordinate axis and the abscissa axis, and the plotting on the display device of the computer system;
   selecting an inflection point of the predicted log responsive to a pointing device coupled to the computer system;
   shifting horizontal position of the inflection point relative to the measured log responsive to the pointing device;
   changing dip of at least one modeled surface in a structural model based on the relative location of the inflection point;
   recalculating the predicted log based on the change in dip, the recalculating creates a modified predicted log; and then
   plotting the modified predicted log.

2. The method of claim 1 further comprising adding a fixed X, Y, Z point in the at least one modeled surface based on location of the inflection point.

3. The method of claim 1 further comprising:
   plotting values of the modeled surface in a second pane, distinct from the first pane, of the display device of the computer system; and then
   plotting changes in dip that correspond to changes in horizontal position of the inflection point.

4. The method of claim 3 wherein plotting values of the modeled surface further comprises plotting the values as a line segment.

5. The method of claim 1 further comprising animating changes in the predicted log responsive to changes of horizontal position of the inflection point.

6. The method of claim 1 wherein changing dip further comprises changing dip such that a vertical distance between a representation of the wellbore trajectory and the at least one modeled surface, at the horizontal location of the inflection point, remains constant.

7. The method of claim 1 further comprising changing drilling direction of a drill string within a wellbore based on the dip of the modeled surface after the changing dip.

8. The method of claim 1 wherein selecting the inflection point of the predicted log further comprises selecting at least one selected from the group consisting of: selecting a maxima; and selecting a minima.

9. A computer system comprising:
   a processor;
   a memory coupled to the processor;
   a display device coupled to the processor;
   a pointing device coupled to processor;
   wherein the memory stores a program that, when executed by the processor, causes the processor to:
   plot, on the display device in a first pane, a measured log with respect to a horizontal axis representing a location along a wellbore, and a vertical axis representing magnitude of values of the measured log;
   plot, on the display device in the first pane, a predicted log with respect to the horizontal axis and the vertical axis representing magnitude of values of the measured log;
   select, within the first pane, an inflection point of the predicted log, the selection responsive to a user's interaction with the pointing device;
   shift horizontal position of the inflection point relative to the measured log responsive to the pointing device;
   change dip of at least one modeled surface in a structural model based the relative location of the inflection point;
   recalculate the predicted log based on the change in dip, the recalculation creates a modified predicted log; and then
   plotting the modified predicted log.

10. The system of claim 9 wherein the program further causes the processor to add a fixed X, Y, Z point in the at least one modeled surface based on location of the inflection point.

11. The computer system of claim 9 wherein the program further causes the processor to:
    plot, on the display device in a second pane distinct from the first pane, at least a portion of the modeled surface, wherein the representation of the modeled surface shows dip of the modeled surface; and then
    plot, within the second pane, changes in dip that correspond to relative location of the inflection point to the measured log as the relative location changes.

12. The computer system of claim 11 wherein when the processor plots the changes, the program causes the processor to animate changes in the predicted log as location of the inflection point changes during the shift in horizontal position.

13. The computer system of claim 11 wherein when the processor plots at least a portion of the modeled surface, the program causes the processor to plot the values as a line segment.

14. The computer system of claim 9 wherein when the processor changes dip, the program causes the processor to change dip such that a vertical distance between a representation of the wellbore trajectory and the modeled surface, at the horizontal location of the inflection point, remains constant.

15. The computer system of claim 9 wherein when the processor selects and shifts, the program further causes the processor to perform a drag-and-drop operation regarding the inflection point.

16. A non-transitory computer-readable medium storing a program that, when executed by a processor, causes the processor to:
    plot, on the display device in a first pane, a measured log with respect to a horizontal axis representing a location along a wellbore, and a vertical axis representing magnitude of values of the measured log;
    plot, on the display device in the first pane, a predicted log with respect to the horizontal axis and the vertical axis representing magnitude of values of the measured log;
    select, within the first pane, an inflection point of the predicted log, the selection responsive to a user's interaction with the pointing device;
    shift horizontal position of the inflection point relative to the measured log responsive to the pointing device;
    change dip of at least one modeled surface in a structural model based the relative location of the inflection point;
    recalculate the predicted log based on the change in dip, the recalculation creates a modified predicted log; and then
    plot the modified predicted log.

17. The non-transitory computer-readable medium of claim 16 wherein the program further causes the processor to add a fixed X, Y, Z point in the at least one modeled surface based on location of the inflection point.

18. The non-transitory computer-readable medium of claim 16 wherein the program further causes the processor to:
- plot, on the display device in a second pane distinct from the first pane, at least a portion of the modeled surface, wherein the representation of the modeled surface shows dip of the modeled surface; and then
- plot, within the second pane, changes in dip that correspond to relative location of the inflection point to the measured log as the relative location changes.

19. The non-transitory computer-readable medium of claim 18 wherein when the processor plots the changes, the program causes the processor to animate changes in the predicted log as location of the inflection point changes during the shift in horizontal position.

20. The non-transitory computer-readable medium of claim 18 wherein when the processor plots at least a portion of the modeled surface, the program causes the processor to plot the values as a line segment.

21. The non-transitory computer-readable medium of claim 16 wherein when the processor changes dip, the program causes the processor to change dip such that a vertical distance between a representation of a wellbore trajectory and the modeled surface, at the horizontal location of the inflection point, remains constant.

22. The non-transitory computer-readable medium of claim 16 wherein when the processor selects and shifts, the program further causes the processor to perform a drag-and-drop operation regarding the inflection point.

23. The non-transitory computer-readable medium of claim 16 wherein when the processor changes dip, the program causes the processor to fix the location within the modeled surface with respect to further changes in dip.

\* \* \* \* \*